(12) United States Patent
Roberts, Jr.

(10) Patent No.: US 9,272,484 B2
(45) Date of Patent: Mar. 1, 2016

(54) STRUCTURAL PLASTIC ARTICLES, METHOD OF USE, AND METHODS OF MANUFACTURE

(76) Inventor: Richard W. Roberts, Jr., Tecumseh, MI (US)

( * ) Notice: Subject to any disclaimer, the term of this patent is extended or adjusted under 35 U.S.C. 154(b) by 1073 days.

(21) Appl. No.: 13/358,181

(22) Filed: Jan. 25, 2012

(65) Prior Publication Data

US 2013/0189470 A1 Jul. 25, 2013

(51) Int. Cl.
| | |
|---|---|
| *B32B 37/00* | (2006.01) |
| *B32B 5/16* | (2006.01) |
| *B29C 44/12* | (2006.01) |
| *B29C 44/44* | (2006.01) |
| *B32B 5/20* | (2006.01) |
| *B32B 27/06* | (2006.01) |
| *B32B 27/32* | (2006.01) |
| *B29L 31/00* | (2006.01) |
| *B29C 51/26* | (2006.01) |

(52) U.S. Cl.
CPC ............... *B32B 5/16* (2013.01); *B29C 44/1233* (2013.01); *B29C 44/445* (2013.01); *B32B 5/20* (2013.01); *B32B 27/065* (2013.01); *B32B 27/32* (2013.01); *B29C 51/267* (2013.01); *B29L 2031/7178* (2013.01); *B32B 2266/025* (2013.01); *Y10T 428/233* (2015.01)

(58) Field of Classification Search
CPC .. B29C 44/146; B29C 44/16; B29C 44/1228; B29C 44/1223; B29C 44/18
USPC ........... 264/45.4, 45.1, 45.2, 45.5, 46.4, 46.5, 264/46.6, 46.8, 50, 51
See application file for complete search history.

(56) References Cited

U.S. PATENT DOCUMENTS

| | | |
|---|---|---|
| 776,342 A | 11/1904 | McCormick |
| 1,588,778 A | 6/1926 | Sorensen |
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |

(Continued)

FOREIGN PATENT DOCUMENTS

| | | |
|---|---|---|
| EP | 0542302 | 5/1993 |
| EP | 0535147 | 9/1996 |

(Continued)

OTHER PUBLICATIONS

Vehicle Certification Agency Oct. 25, 2007, pp. 1-6, Test Report No. ESH178571, "Test Report: Seat Strength."

(Continued)

*Primary Examiner* — Stella Yi
(74) *Attorney, Agent, or Firm* — Brooks Kushman P.C.

(57) ABSTRACT

In at least one embodiment, a plastic article comprises a first plastic layer having a periphery and defining a cavity. An expanded polymer particle core is formed in-situ and heat-bonded to the cavity. The expanded polymer particle core has an apparent bulk density ranging from 1 lb/ft$^3$ to 20 lb/ft$^3$. The article supports a dynamic load or static load exceeding 1.3 lbf/in$^2$.

10 Claims, 8 Drawing Sheets

(56) References Cited

U.S. PATENT DOCUMENTS

| | | |
|---|---|---|
| 3,563,845 A | 2/1971 | Stevens |
| 3,598,312 A | 8/1971 | Hamilton, Jr. |
| 3,745,998 A | 7/1973 | Rose |
| 3,774,968 A | 11/1973 | Fenton |
| 3,813,040 A | 5/1974 | Heinemeyer |
| 3,935,044 A | 1/1976 | Daly |
| 4,361,656 A | 11/1982 | Mostafa |
| 4,492,663 A | 1/1985 | Reinfeld et al. |
| 4,546,899 A | 10/1985 | Williams |
| 4,573,741 A | 3/1986 | Kirchner-Carl |
| 4,621,002 A | 11/1986 | Kuhlmann et al. |
| 4,651,494 A | 3/1987 | Van Wagoner |
| 4,680,909 A | 7/1987 | Stewart |
| 4,825,089 A | 4/1989 | Lindsay |
| 4,840,973 A | 6/1989 | Kuwabara et al. |
| 5,018,329 A | 5/1991 | Hasan et al. |
| 5,023,042 A | 6/1991 | Efferding |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,275,860 A | 1/1994 | D'Luzansky et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,665,285 A * | 9/1997 | Hattori et al. ............... 264/45.4 |
| 5,711,073 A | 1/1998 | Tippmann et al. |
| 5,713,518 A | 2/1998 | Fox |
| 5,759,459 A | 6/1998 | Eckardt et al. |
| 5,786,394 A | 7/1998 | Slaven |
| 5,824,261 A | 10/1998 | Berdan |
| 5,858,159 A | 1/1999 | Holbrook et al. |
| 5,866,224 A | 2/1999 | Ang et al. |
| 5,956,905 A | 9/1999 | Wiedrich |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,375,892 B2 | 4/2002 | Thomas |
| 6,605,343 B1 | 8/2003 | Motoi et al. |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,955,576 B2 | 10/2005 | Yeh |
| 6,972,144 B2 | 12/2005 | Roth et al. |
| 7,201,112 B2 | 4/2007 | Jolley |
| 7,201,625 B2 | 4/2007 | Yeh |
| 7,219,479 B2 | 5/2007 | Durning et al. |
| 7,358,280 B2 | 4/2008 | Berghmans et al. |
| 7,377,828 B2 | 5/2008 | Cheung |
| 7,401,998 B2 | 7/2008 | Wilson et al. |
| 7,485,352 B2 | 2/2009 | Yuasa et al. |
| 7,537,413 B1 | 5/2009 | Brugos |
| 7,931,210 B1 | 4/2011 | Pike et al. |
| 7,950,592 B2 | 5/2011 | Yuan |
| 7,976,749 B2 | 7/2011 | Volkel et al. |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0003044 A1 * | 1/2006 | DiNello et al. ............... 425/412 |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2009/0100780 A1 | 4/2009 | Mathis et al. |
| 2010/0028654 A1 | 2/2010 | Takase et al. |
| 2010/0116180 A1 | 5/2010 | Roth et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0328889 A1 | 12/2012 | Hayashi et al. |
| 2013/0140860 A1 | 6/2013 | Naughton et al. |

FOREIGN PATENT DOCUMENTS

| | | |
|---|---|---|
| JP | 58213028 A | 12/1983 |
| JP | 59155443 A | 9/1984 |
| JP | 59210954 A | 11/1984 |
| JP | 60090744 A | 5/1985 |
| JP | 06166112 | 6/1994 |
| JP | 07195536 | 8/1995 |
| WO | 9119867 | 12/1991 |
| WO | 2011103284 | 8/2011 |

OTHER PUBLICATIONS

ECE Agreement Jul. 31, 2002, Regulation No. 17, "Concerning the adoption of uniform technical prescriptions for wheeled vehicles, equipment and parts which can be fitted and / or used on wheeled vehicles and the conditions for reciprocal recognition of approvals granted on the basis of these prescriptions."

Product Information: "Arplank, Expanded Bead Foam Packaging Materials", www.jsp.com, pp. 1-21.

Allison Manning, "Choosing Plastic", www.mmh.com, Oct. 2008.

Sarah Pearson Specter, "The Rise of the Plastic Pallet", Modern Materials Handling, Sep. 2009, pp. 1-4.

* cited by examiner

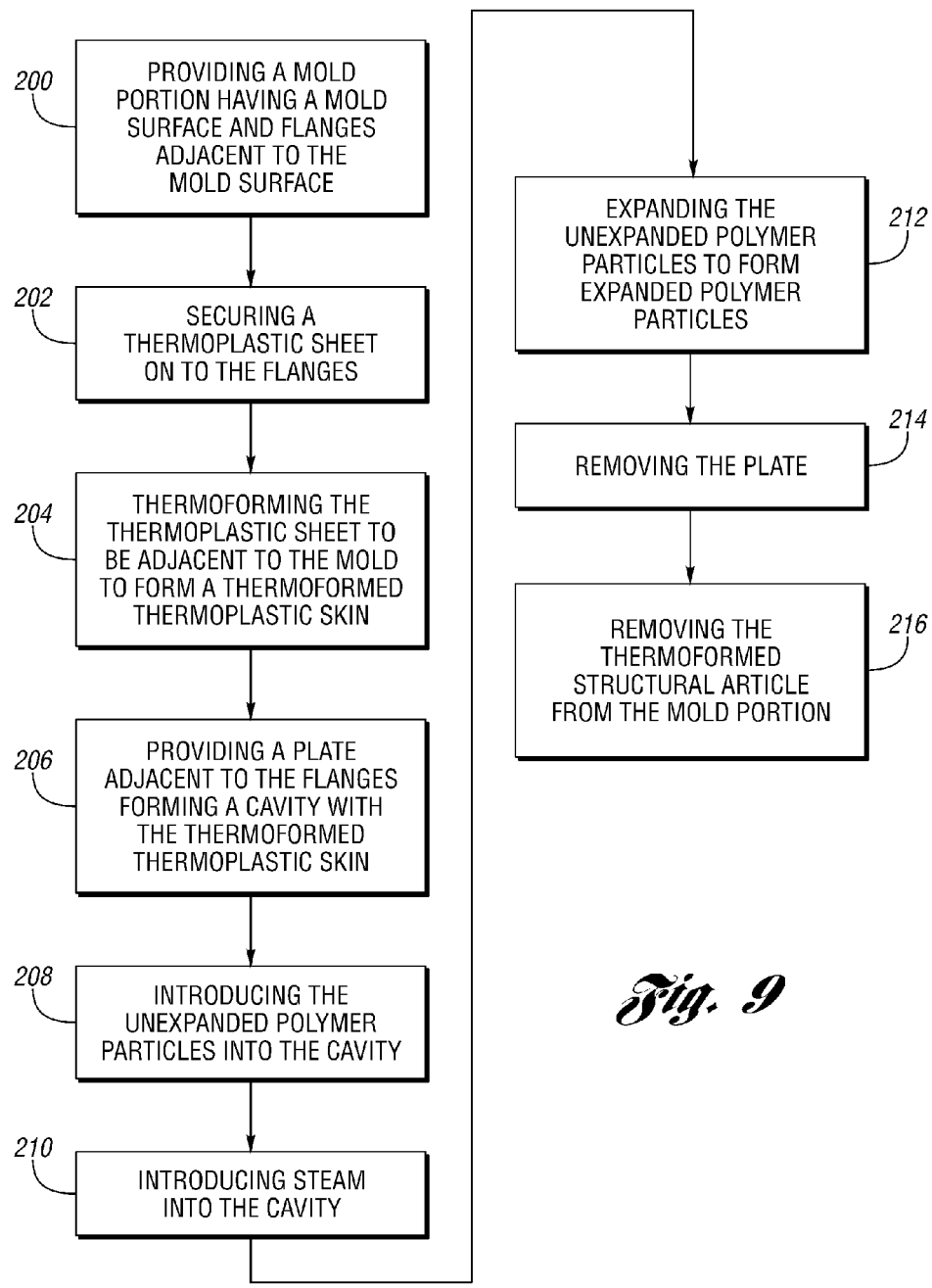

STRUCTURAL PLASTIC ARTICLES, METHOD OF USE, AND METHODS OF MANUFACTURE

TECHNICAL FIELD

One or more embodiments of the present invention related to structural plastic articles having a foam core and a plastic skin, methods of use, and methods of manufacture.

BACKGROUND

Supporting heavy loads is most economical when a load is supported by a stiff and rigid article having the maximum span between support structures without unacceptable deformation of the article.

Methods for creating large stiff and rigid articles may be constrained by the size, injection pressure resistance, and expense of molding equipment needed for manufacturing these large articles. For example, a blow molding parison experiences significant stretching and thinning, possibly to the extent of failure, when trying to make an article over eight feet in length or four feet wide.

SUMMARY

In at least one embodiment, a plastic article comprises a first plastic layer having a periphery and defining a cavity. An expanded polymer particle core is formed in-situ and heat-bonded to the cavity. The expanded polymer particle core has an apparent bulk density ranging from 1 lb/ft$^3$ to 20 lb/ft$^3$. The article supports a dynamic load or static load exceeding 1.3 lbf/in$^2$.

In another embodiment, a method for forming a plastic article providing a first plastic solid to a first mold, the first mold having a sealing surface and a molding surface. The method also comprises molding by heat the first plastic solid to the molding surface in the first mold to form a first molded skin defining a cavity. The method also includes providing unexpanded polymer particles to the cavity and providing a rigid layer proximate to the sealing surface sealing of the first mold sealing the cavity. The method also comprises expanding the unexpanded polymer particles in-situ to form expanded polymer particles. The method recites bonding by heat the expanded polymer particles to the first molded plastic skin forming the plastic article. The method comprises separating the rigid layer from the first mold when the expanded polymer particles apply less than 0.5 lbf/in$^2$ pressure above ambient pressure to the rigid panel or the first mold. The plastic article is removed from the mold.

In another embodiment, a method for forming a plastic article comprises providing a first heated plastic layer to a first mold section having a first molding surface to form a first molded skin. The method includes thermoforming the first heated plastic layer to first molding surface. The method recites providing a second heated plastic layer to a second mold section having a second molding surface to form a second molded skin and thermoforming the second heated plastic layer to the second molding surface. The first and second molded skins are connected to form a gas-tight cavity. Pre-puff polymer particles are provided to the cavity. A heated medium is injected into the cavity for period of less than 10 seconds expanding the pre-puff polymer particles to form an in-situ core of expanded polymer particles. The core is heat-bonded to the first and second molded skins forming the plastic article, which is released from the first and second mold section.

BRIEF DESCRIPTION OF THE DRAWINGS

FIG. 9 recites a method of manufacture according to at least one embodiment;

DETAILED DESCRIPTION

Figure 1:
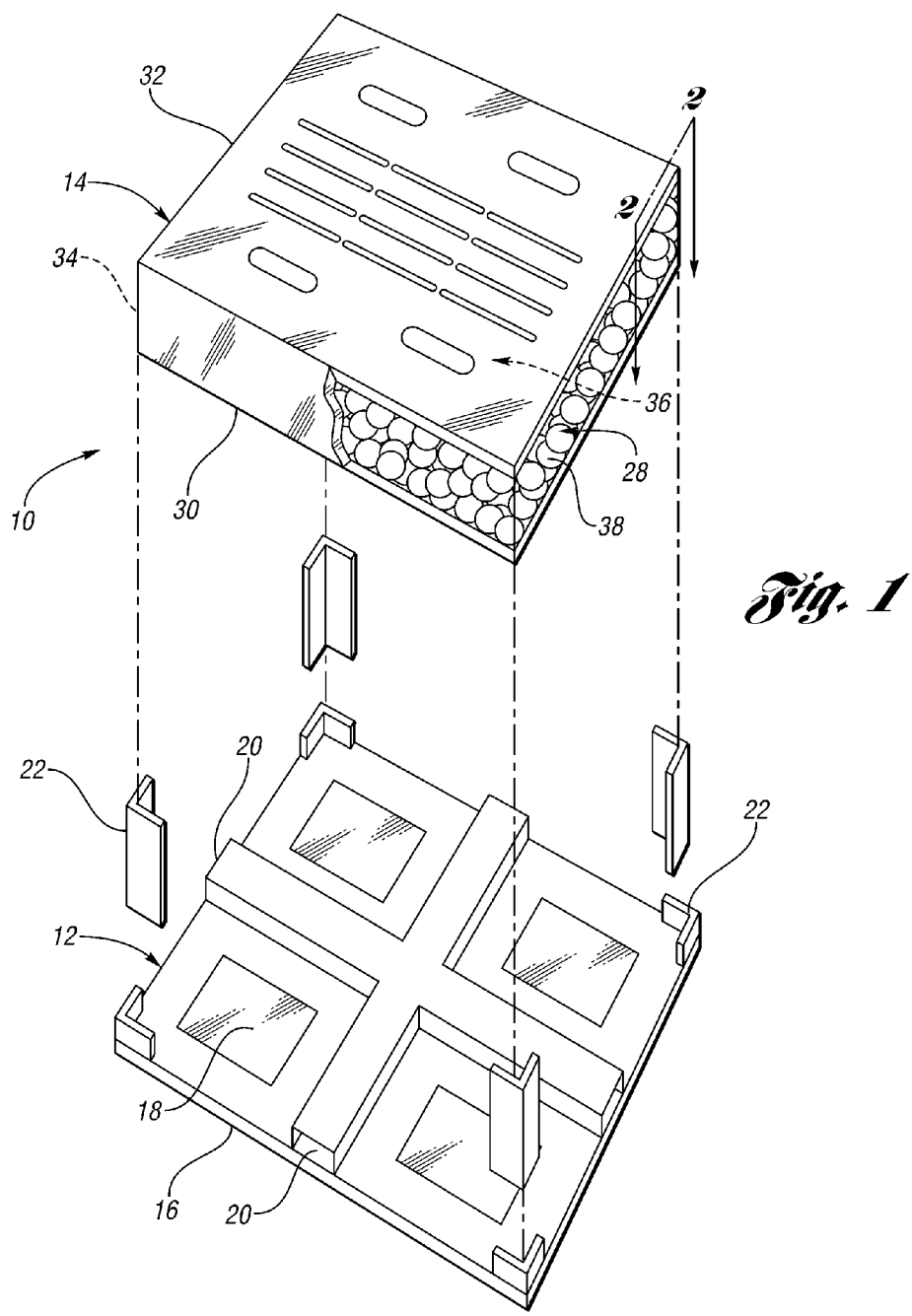
FIG. 1 schematically illustrates an exploded view of an article according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "copolymer," "terpolymer," "pre-polymer," and the like.

Structural plastic articles may be substituted for other materials and may take advantage of design properties of plastics. An example of plastics' design advantage includes the ability to combine multiple components into one article.

Further, plastics articles may be designed to have specific properties in specific locations of the article through the use of reinforcements or weight reducing structures.

Examples of structural plastic articles include, but are not limited to a pallet, a pallet component, a deck, a materials handling support system, an associated intermodal platform, and a unit load device. Further examples may include large articles such as a garage door, a fenestration frame structure, a marine landing terminal, and building panels. Additional examples may include structural substitutes for aesthetic and functional articles where multiple parts may be consolidated into one or a small number of components, such as an automotive wheel wells, an automotive floor pan, a vehicle seat back, a head liner, and the truck bed liner or cap.

FIG. 1 schematically illustrates a reusable pallet assembly 10 according to at least one embodiment. The reusable pallet assembly 10 includes a bottom deck 12 and a top deck 14. Bottom deck 12 includes a bottom frame 16 defining apertures 18. Connected to the bottom frame 16 are ribs 20 and support stand offs 22. Ribs 20 in support stand offs 22 support top deck 14 with optional spacers 22.

Top deck 14 includes a plastic layer 30 that when assembled is adjacent to in the ribs 20 and support stand offs 22 of bottom deck 12. Another plastic layer 32 is opposed to and spaced apart from plastic layer 30. Connecting layers 30 and 32 are plastic walls 34 defining a cavity 36. Cavity 36 is filled with expanded polymer particles 38 forming a core 28.

In certain embodiments, plastic layer 30, plastic layer 32, and plastic wall 34 are formed during the same manufacturing process, such as a twin sheet thermoforming process, a rotocasting process, or a rotomolding process.

In at least one embodiment, plastic layer 30, plastic layer 32, and/or plastic walls 34 have a thickness range from 0.01 inches to 0.375 inches. In another embodiment, plastic layer 30, plastic layer 32, and/or plastic walls 34 have a thickness range from 0.05 inches to 0.3 inches.

In another embodiment, plastic layer 30, plastic layer 32, and plastic wall 34 are formed during separate manufacturing processes in are subsequently assembled into an article. A non-limiting example includes making plastic layer 30 as a flanged channel including plastic wall 34 in securing the flanged channel to plastic layer 32 formed by a single sheet thermoforming process. Because of the positioning of the parting line 50, a stabilization tip 46 may be added to plastic layer 32 which is useful in commercial shipment applications.

Core 28 may include expandable polymer particles such as expanded polyolefin polymer beads. In at least one embodiment, the expanded polyolefin polymer beads include expanded polypropylene polymer beads (EPP). In yet another embodiment, core 28 includes expanded high molecular weight polypropylene polymer beads. In yet another embodiment, homopolymer beads are included in the expanded polyolefin beads in order to increase the stiffness of core 28. As a non-limiting example, when the homopolymer polyolefin is a homopolymer polypropylene, the stiffness increases such that a 100,000 lbf/ft$^2$ load yields a 5.8% strain and a compression of only 0.007 inches. In another example, the strain ranges from 2% strain to 10% strain when the 100,000 lbf/ft$^2$. In at least one embodiment, EPP may be formed in situ by injection of steam into polypropylene beads to form steam-injected expanded polypropylene beads while the plastic layer 30 of the retainer panel 12 remains in the closed mold in order to constrain expansion of the core 28 and plastic layer 30 during the steam expansion of the particles such as beads 36. It is understood that a portion of core 28 may comprise polyolefin beads in an unexpanded configuration or a partially expanded configuration.

While expanded polyolefin polymer beads, such as EPP, are used in the illustration, it is understood that other expandable polymer particle compositions may be contemplated. Non-limiting examples of other expandable polymer particles may include, but are not limited to expanded polyolefin particles, expanded polyethylene (EPE) particles, cross-linked expanded polyethylene (xEPE) particles, polyphenyloxide (PPO) particles, biomaterial particles, such as polylactic acid (PLA), and polystyrene particles. It is also understood that some of the particles may be unexpanded, also known as pre-puff, partially and/or wholly pre-expanded without exceeding the scope or spirit of the contemplated embodiments.

Plastic layer 30, plastic layer 32, and plastic wall 34 may be formed from a polymeric composition. The polymeric composition may include thermoplastic and/or thermoset polymers. In at least one embodiment, the polymeric composition is recyclable. Non-limiting examples of polymeric compositions suitable for plastic layer 30 include polylactic acid and polyolefins, such as polypropylene and polyethylene. In at least one embodiment, the polymeric compositions of plastic layers 30 and 32 and plastic wall 34 may differ. In one preferred embodiment, plastic layer 30 comprises ultrahigh molecular weight polyethylene (UHMWPE) while plastic layer 32 comprises high density polyethylene (HDPE). In another preferred embodiment, plastic layer 30 comprises neat polypropylene resin while plastic layer 32 and plastic wall 34 comprises 15 wt. % fiberglass-filled polypropylene resin. In yet another preferred embodiment, plastic layer 30 and plastic wall 34 comprise polypropylene homopolymer material while plastic layer 32 comprises ethylene propylene copolymer material.

Plastic layer 30, plastic layer 32, and plastic wall 34 may be formed from one or more thermoplastic compositions. In at least one embodiment, the thermoplastic composition includes a fire-retarded thermoplastic composition, an anti-microbial-doped thermoplastic composition, a fungicide-doped thermoplastic composition, or a thermoplastic composition having crosslinks, and a graft polymer composition. In another embodiment, the thermoplastic composition includes a terpolymer composition, a copolymer composition, a homopolymer composition, and a biopolymer composition. In yet another embodiment, the thermoplastic composition includes a polyolefin composition, an ethylenically unsaturated polymer composition, an acrylic polymer composition, a terephthalate polymer composition, a polystyrene polymer composition or a polycarbonate polymer composition.

In certain embodiments, especially when the environment for use is cold, plastic layer 30 includes a blend of a non-polyolefin thermoplastic polymer as polyolefin, such as a thermoplastic polyolefin/polypropylene blend, a thermoplastic elastomer/polypropylene blend, a thermoplastic polymer having a glass transition temperature less than −80° C. and polyolefin blend, a thermoplastic polymer having a glass transition temperature less than −20° C. and polyolefin blend, a thermoplastic vulcanizate/polyolefin blend, and a heterogeneous polymer blend.

In certain embodiments, heterogeneous polymer blends have a crystalline thermoplastic phase and a high molecular weight and/or crosslinked elastomeric phase such as supplied by ExxonMobil or Advanced Elastomer Systems.

In at least one embodiment, in a heterogeneous polymer blend, an amount present of the non-polyolefin thermoplastic polymer ranges from 5 wt. % to 70 wt. % of the quantity of blend. In another embodiment, the amount of thermoplastic polymer present ranges from 10 wt. % to 40 wt. %.

In at least one embodiment, the ratio of non-polyolefin thermoplastic polymer to polyolefin ranges from 0.1 to 10 in the heterogeneous polymer blend. In another embodiment, the ratio of non-polyolefin thermoplastic polymer to polyolefin ranges from 0.2 to 5. In yet another embodiment, the ratio of non-polyolefin thermoplastic polymer to polyolefin ranges from 0.3 to 2.

Figure 2:
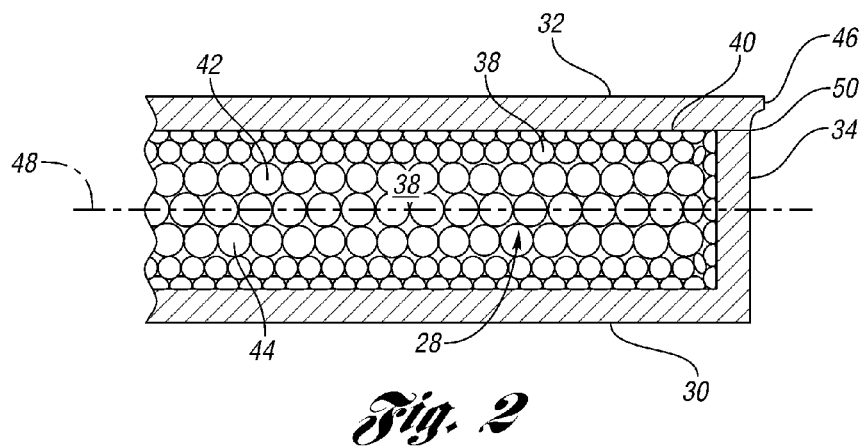
FIG. 2 illustrates a cross-sectional view along axis 2-2 of FIG. 1.

FIG. 2 illustrates a fragmentary cross-section of top deck 14 along axis 2-2 of FIG. 1 according to at least one embodiment. Plastic layer 30, plastic layer 32, and plastic wall 34 defining a cavity 36. Core 28 is disposed within cavity 36. Core 28 includes, in at least one embodiment, a layer of partially melted expanded polymer particles 40 adjacent to plastic layers 30 and 32 and plastic wall 34. Partially melted expanded polymer particles 40 are heat bonded to plastic layers 30 and 32 and plastic wall 34 during an expansion process. Core 28, in at least one embodiment, includes a lower density zone 42 comprising larger diameter expanded polymer particles 40 and a higher densities on 44 comprising smaller diameter expanded polymer particles 40. The higher density zone 44 is positioned further from a neutral axis 48 enhancing the stiffness of top deck 14 composite sandwich structure. Lower density zone 42 is positioned about the neutral axis 48 where it contributes a lesser amount of the stiffness of top deck 14 composite sandwich structure. Having a lower density zone 42 reduces the weight of a top deck 14 which is advantageous to users who are trying to conserve fuel and meet OSHA lifting restrictions. In certain embodiments, the article, such as top deck 14, may need to be cooled in a cooling fixture in order to minimize distortion of the article arising from stresses released or arising during cooling.

Steam-injected expanded polypropylene (EPP) may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam injected EPP may have a density ranging from 3 lbs/ft$^3$ to 5 lbs/ft$^3$.

In another embodiment, expanded polypropylene beads in core 28, such as supplied by JSP, Inc. as ARPRO® brand beads, have a stress-strain relation when tested according to ISO 844 using a 5 mm by 5 mm specimen at 45 g/L density of the expanded polymer particles, as shown in Table 1.

TABLE 1

| Strain (%) | Stress (MPa) |
| --- | --- |
| 5 | 0.18 |
| 10 | 0.20 |
| 15 | 0.22 |
| 20 | 0.23 |
| 25 | 0.25 |
| 30 | 0.26 |
| 35 | 0.28 |
| 40 | 0.30 |
| 45 | 0.32 |
| 50 | 0.34 |
| 55 | 0.38 |
| 60 | 0.42 |
| 65 | 0.46 |
| 70 | 0.58 |
| 75 | 0.72 |
| 80 | 0.97 |

Integrating the area under the stress-strain curve, in at least one embodiment, yields a toughness of the expandable polymer particles in core 28 exceeding 15 kJ/m$^3$. In another embodiment, the toughness of the expandable polymer particles ranges from 20 kJ/m$^3$ to 50 kJ/m$^3$.

Figure 3A:
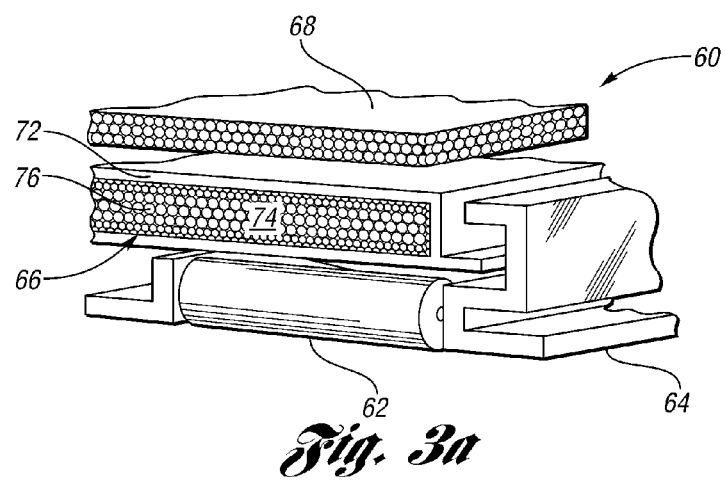
FIGS. 3a-3b schematically illustrate fragmentary views of an article according to at least one embodiment.

FIG. 3a illustrates a fragmentary isometric cross-sectional view all of additional embodiments of pallets. A roll on-roll off assembly 60 such as used by the military in cargo airplanes is shown. A roller 62 is connected to a track 64. Positioned on roller 62 and engaged with track 64 is a 463-L-type pallet 66. The 463-L-type pallet 66 is a military system uses a flush pallet for easily handling using rollers 62 on a cargo aircraft floor. Prior art versions of the standard 463-L-type pallet include aluminum with a wooden core. Such wood and aluminum pallets have a maximum load of 4.5 metric tonnes (10.2 lbs/in$^2$) and is dimensionally 2734×2235 mm, which is too large for most blow molding machines and injection molding machines. The wood and aluminum pallets weigh 290 lbs. As a consequence, the wood and aluminum pallets are very expensive and heavy limiting their use intermodally. With the wood and aluminum pallets system, shipments that are delivered to a destination by any air need to be broken down and transferred to other types of pallets or containers. Such transfers increase the total cost of the logistics arrangements.

Figure 3B:
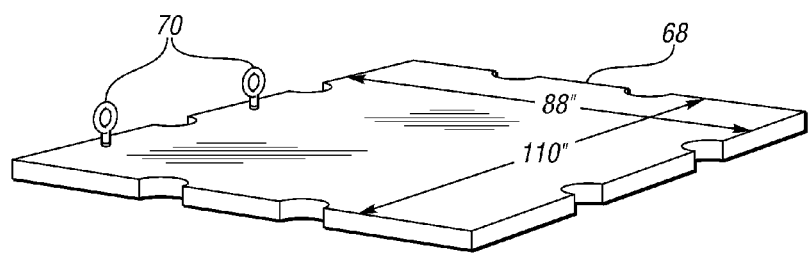

FIG. 3a further shows an associated intermodal platform (AIP) 68 positioned on top of 463-L-type pallet 66. AIP 68 includes lifting bolts 70 as illustrated in FIG. 3b, which is an isometric view of AIP 68.

In at least one embodiment, 463-L-type pallet 66 includes a exterior plastic shell 72 formed by rotomolding and defining a cavity 74. Cavity 74 ranges in thickness from 5 inches to 10 inches. Filling cavity 74 is a high-density expanded polymer particle core 76.

In another embodiment, 463-L-type pallet 66 includes the exterior plastic shell 72 formed by twin sheet thermoforming.

In at least one embodiment, a density of core 76 ranges from 1 lb/ft$^3$ to 20 lb/ft$^3$. In another embodiment, core 76 as a density ranging from 6 lb/ft$^3$ to 17 lb/ft$^3$. In yet another embodiment, core 76 has a density ranging from 10 lb/ft$^3$ to 15 lb/ft$^3$.

In at least one embodiment, the article, such as bottom deck 12, has a thickness ranging from 0.25 inches to 4 inches in at least one directional plane. In another embodiment, the article has a thickness range from 1 inch to 3 inches in at least one directional plane. As non-limiting example, the distance between plastic layer 30 and plastic layer 32 may comprise the thickness.

In at least one embodiment, pallet 66 as a maximum load exceeding 1.3 lbf/in$^2$. In at another embodiment, pallet 66 as a maximum load exceeding 2.5 lbf/in$^2$. In another embodiment, pallet 66 as a maximum load ranging from 1 lbf/in$^2$ to 15 lbf/in$^2$. It is understood the load may be static or dynamic without exceeding the scope or spirit of the embodiments.

In at least one embodiment, pallet 66 ranges in weight from 80 pounds to 200 pounds. In another embodiment, pallet 66 ranges in weight from 100 pounds to 180 pounds. Such a range is 30% to 60% of typical prior art 463-L pallets. Reducing weight may reduce the cost of fuel to transport 463-L pallets made with core 76. Further, reducing weight may allow increased quantities of shipped product to be sent in a shipment before a maximum is reached, such as 40,000 pounds in typical over the road semi-trailers.

Figure 4:
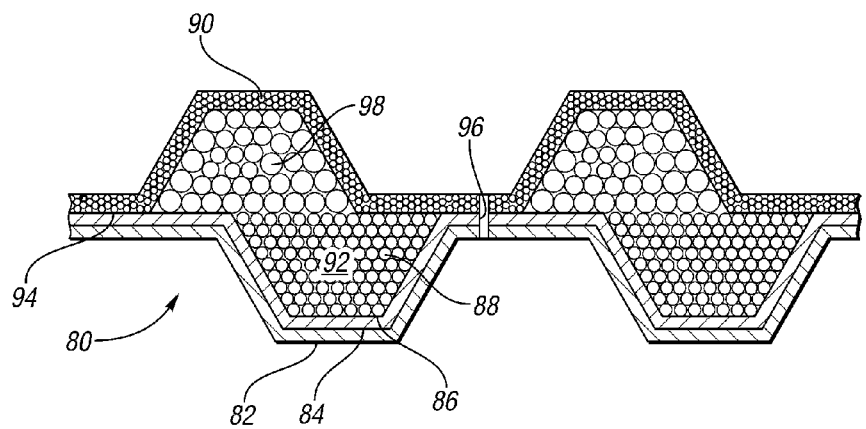
FIG. 4 illustrates a cross-sectional view of an article according to another embodiment.

Turning now to FIG. 4, an embodiment of a packaging component 80 a schematically illustrated in cross-sectional view. A plastic layer 82 includes a plastic sheet 84 and a plastic sheet 86. Plastic sheet 84 exposed to the environment includes additives to make it resist photodegradation and migration of plasticizers to the surface. Plastic sheet 86 is situated closer to core 88 and may use recycled resins or biomaterials such as PLA. Plastic layer 82 may be thermoformed as one sheet in a single sheet thermoforming process. Core 88 is formed when the expanded polymer particles 38 are added in an unexpanded form to a cavity 92 defined by the thermoformed plastic layer 82. A plate (not shown) is applied to plastic layer 82 while it is still in the thermoforming mold (not shown). The unexpanded polymer particles also known as pre-puff, are exposed to a heating medium such as superheated steam to form expanded polymer particles 38 to comprise core 88.

When the pre-puff particles 38 are added to cavity 92, it is advantageous to transfer in a timely manner the particles 38 using a fill gun (not shown) have a fill pressure greater than ambient pressure, in at least one embodiment. In another embodiment, the fill pressure ranges from 10 lbf/in$^2$ to 70 lbf/in$^2$. In a preferred embodiment, the fill pressure ranges from 25 lbf/in$^2$ to 50 lbf/in$^2$. It is understood that the fill pressure may be attained using vacuum removal of air from cavity 92.

When steam is applied to pre-puff particles 38, in certain embodiments, a steam port may be positioned adjacent to a vent port on or within cavity 92. In other embodiments, steam ports may be situated in an alternating line with the steam ports in one line opposite vent ports in a second line. Further, in at least one embodiment, when steam ports are situated in one line, open the steam ports sequentially along the line improving fill and packing of the cavity 92. In another embodiment, steam ports may open in irregular pattern or substantially simultaneously. Vent port openings may be sequenced, in certain embodiments.

Plastic layer 90, in at least one embodiment, includes a foamed plastic sheet that may be thermoformed in a separate single sheet thermoforming process. A core 98 of expanded polymer particles 38 may be formed in plastic layer 90 in a process analogous to core 88 in plastic layer 82. It is understood that the composition of core 98 may be the same or differ from core 88. It is also understood that the composition of layers 84 and 86 may be the same or differ from layer 90.

The packaging unit 80 may be assembled by applying adhesive in an adhesive layer 94 situated between the peripheries of plastic layers 82 and 90. In at least one embodiment, plastic layers 82 and 90 are secured by welding the two layers together using either heat or ultrasonic welding. An exemplary weld line 96 is illustrated. It should be understood other fastening methods known in the art may also be used to assemble packaging unit 80.

It should be further understood that while the single sheet thermoformed process is disclosed, other thermoforming processes may be used without exceeding the scope or spirit of the embodiments. Non-limiting examples of thermoforming processes include, but are not limited to, vacuum forming, plug assist forming, snapback forming, billow forming, free forming, pressure forming, drape forming, stretch forming, matched die forming, inline thermoforming, twin sheet forming, and/or mechanical thermoforming.

Figure 5:
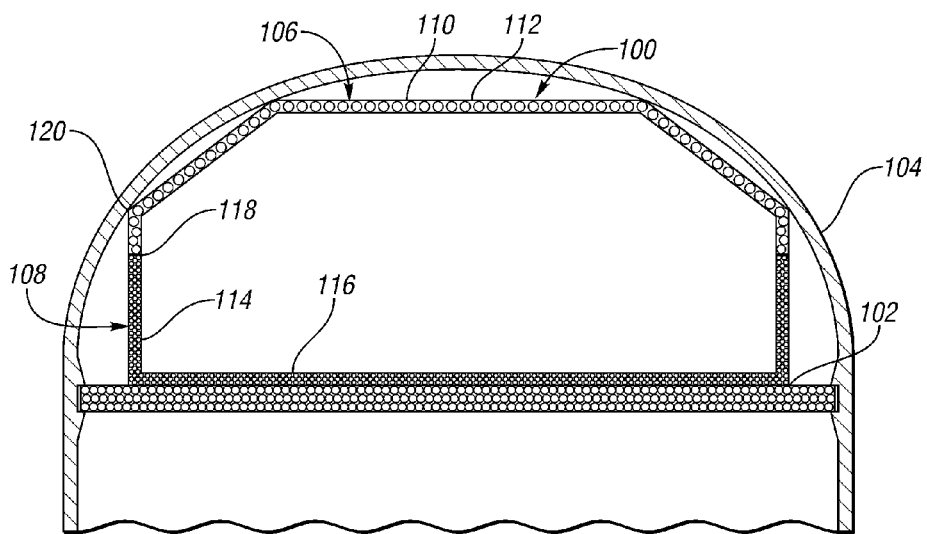
FIG. 5 illustrates a cross-sectional view of an article according to another embodiment.

Turning now to FIG. 5, a fragmentary cross-section view of a unit loading device 100 is illustrated on a floor 102 which is connected to an airframe 104.

For commercial airfreight the containers have to be very lightweight and conform to the hold dimensions and shape of the most common aircraft. The familiar aluminum notched rectangle is the most common and called the Unit Load Device. In at least one embodiment, unit loading device 100 is comprised of a cap portion 106 and a base portion 108. Cap portion 106 includes a core 110 having a lower density of expanded polypropylene beads encapsulated in a skin 112. Base portion 108 includes a relatively higher density of expanded polyethylene beads 114 were originally formed as an annular rectangle having a skin 116 encapsulating expanded polyethylene beads 114. The angular rectangle is subsequently cut in half exposing the expanded polyethylene beads 114 with no skin 116 at a side 118. Cap portion 106 may be attached to a base portion 108 at a seam 120. Cap portion 106 may be attached using fastening methods known in the art, that may include activating side 118 using a primer or a sulfonation treatment to increase surface energy of side 118 such that conventional adhesives may bond the cap portion 106 and base portion 108 together.

Figure 6:
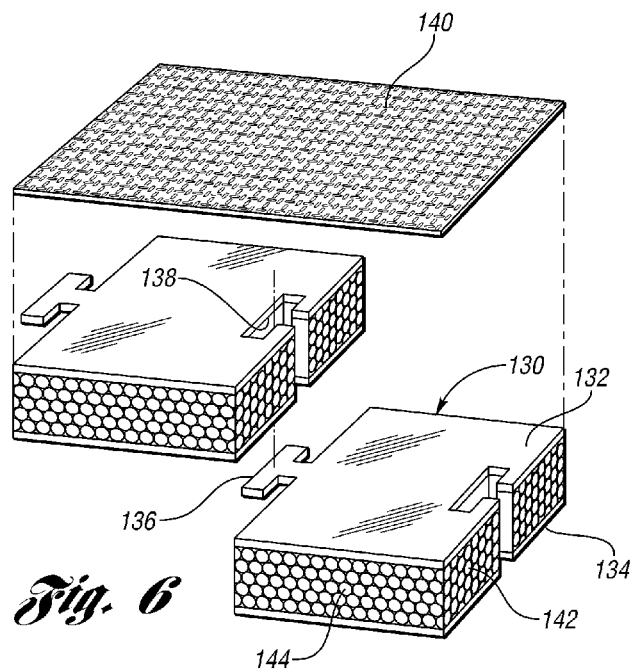
FIG. 6 schematically illustrates an isometric view of an article according to another embodiment.

Turning now to FIG. 6, a fragmentary schematic of a marine terminal design according to at least one embodiment is illustrated. A floating segment 130 includes a first skin 132 and a second skin 134 that are spaced apart forming a cavity 142 into which in expanded polymer particles 144 have been heat bonded in-situ. Expanded polymer particles 144 are fully exposed at the periphery of first and second skins 132 and 134. In at least one embodiment, expanded polymer particles 144 absorb less than 5 wt. % of water after exposure to water for 30 days. In another embodiment, expanded polymer particles 144 absorb less than 2 wt. % of water after exposure to water for 30 days. In yet another embodiment, expanded polymer particles 144 absorb less than 0.75 wt. % of water after exposure to water for 30 days.

The floating segment 130 includes a connector 136 which is adapted to cooperate with a receiving slot 138 permitting a plurality of the floating segments 132 being interconnected to form a large surface area supporting a deck 140. Deck 140 is attached to first scheme 132 of floating segment 130 by fastening means known in the art. In at least one embodiment, floating segment 130 as a length of 30 m and a width of 20 m. Deck 140 weighs approximately 50 metric tonnes and supports a hovercraft weighing approximately 60 metric tonnes. Floating segment 130 and deck 140 may be connected to piles (not shown) situated adjacent to the periphery of floating segment 130 and deck 140. It is understood that while connector 136 and receiving slot 138 are illustrated as T-sections, any locking connection structure known in the art may be used, including a tensioning member.

Figure 7:
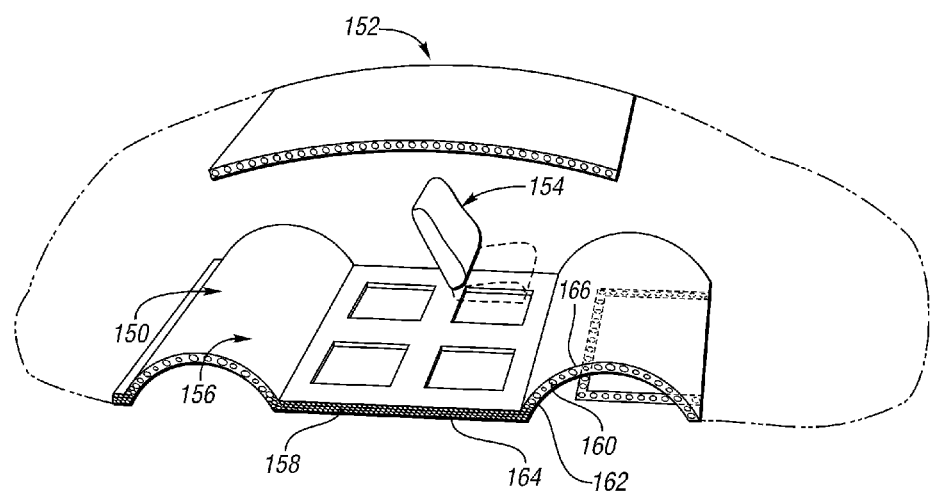
FIG. 7 schematically illustrates an isometric view of an article according to another embodiment.

Turning now to FIGS. 7a-7b, a floor pan 150, a headliner 152, and a seat back 154 for a vehicle are schematically illustrated in an isometric view in FIG. 7a according to at least one embodiment. Floor pan 150 includes a twin sheet thermoformed skin 156 having a plurality of density zones of expanded polymer particles 158 intended to put extra strength in regions having the most stress. An exemplary, relatively higher density zone 160 is situated adjacent to the juncture of the wheel well 162 and the bed 164. Adjacent to the relatively higher density zone 160 is a relatively lesser density zone 166 in which the expanded polymer particles 158, in at least one embodiment, have a plurality of densities intended to capture a plurality of frequencies emanating from road and wind noise as well as vibration and harshness emissions.

FIG. 7b, schematically illustrates a fragmentary cross-sectional view along axis 7b-7b of FIG. 7a, having a plurality of densities according to a least one embodiment. Expanded polymer particles 158 of different sizes may be added using one or more particle dispensers (not shown), the delivery of different sizes being timed to create layers within a thermoformed bottom sheet of twin sheet thermoformed skin 156.

Figure 8A:
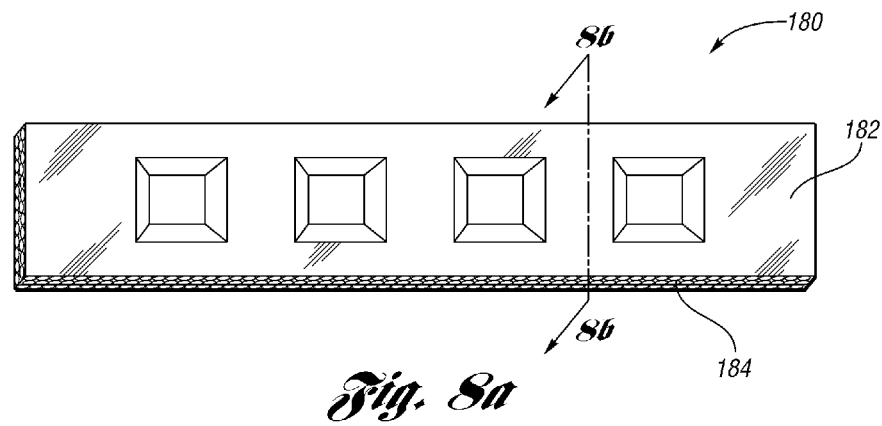
FIGS. 8a-8d schematically illustrates views of an article according to additional embodiments.
Figure 8B:
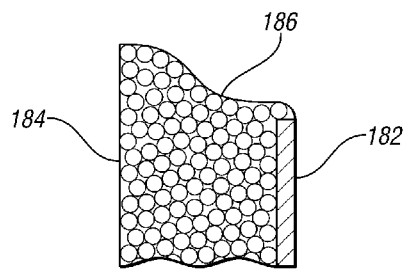

Turning now to FIGS. 8a-8b, FIG. 8a schematically illustrates an isometric view of a garage door segment 180 according to at least one embodiment. The length of the garage door segment 180 may range from 7 feet to 20 feet in length in one embodiment. In other embodiment the length of the garage door segment 180 may range from 15 feet to 19 feet. Such a length is typically beyond the ability to mold using a blow molding process. The garage door industry is typically ultimately sensitive to cost of products. One typical garage door segment design has only a single skin that faces the exterior environment of a house. In at least one embodiment, a single sheet thermoformed skin 182 formed in a single sheet thermoforming mold is heat bonded in situ with an expanded polymer particle backing formed when a plate is placed adjacent to thermoformed skin 182 to form a cavity into which unexpanded polymer particles are introduced. A heating medium, such as superheated steam, is injected into the cavity after the unexpanded polymer particles have been introduced in order to cause the polymer particles to expand. The plate is removed after the polymer particles have stopped expanding so that there is no significant or even measurable post-mold expansion of the polymer particles. The garage door segment 180 is then removed from the single sheet thermoforming mold.

Figure 8C:
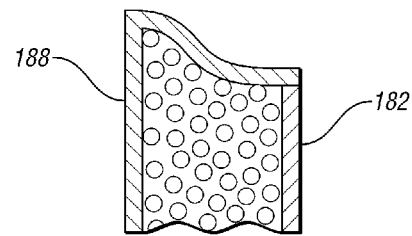
Figure 8D:
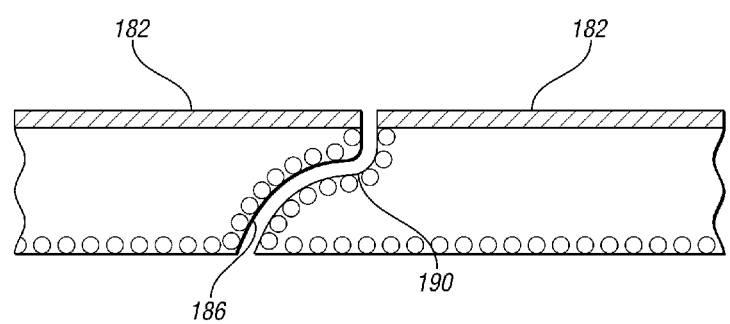

Typical garage door segments, in certain embodiments, may have the periphery of garage door segment 180 machined to either reduce the length of the garage door segment 180 to fit doors manufactured before industry standardized on lengths, or sculpt the edge, such as an edge 186 in FIG. 8b. In at least one embodiment, a non-plastic skin 188 may be bonded to the core 184 to enclose or cover a portion of the second side of the article, as schematically illustrated in FIG. 8c. Foamed core 184 may be adapted to be machined and have sufficient structure to stand independently of skin 182. In another embodiment, edge 186 and a second edge 190 situated on a second garage door panel 192 may be adjacent and cooperate to prevent pinching fingers as the garage door closes as schematically illustrated in cross-sectional view in FIG. 8d.

It is understood that articles may have one or more plastic layers ranging in length from 7 feet to 30 feet, in certain embodiments. In another embodiment, articles may have one or more plastic layers ranging in length from 8 feet to 17 feet.

At least one embodiment illustrated in FIG. 9, in step 200 a method for manufacture of an article having one plastic layer includes providing a mold portion having a mold surface and flanges adjacent to the mold surface. A plastic sheet having a thermoplastic composition is secured to the flanges in step 202. In step 204 the thermoplastic sheet is thermoformed to be adjacent to the mold surface to form a thermoformed thermoplastic skin. A plate is situated adjacent to the flanges forming a cavity with the thermoformed thermoplastic skin in step 206. In step 208, unexpanded polymer particles are introduced into the cavity when the pressure in the cavity is at least 30 pounds per square inch less than the pressure exerted on the unexpanded polymer particles. In step 210, steam is introduced into the cavity causing the unexpanded polymer particles to expand to form expanded polymer particles in step 212. Once the particles have substantially stopped expanding, the plate is removed in step 214. In step 216, the thermoformed structural plastic article is removed from the mold portion. The structural plastic article includes a plastic layer bonded to expanded polymer particles. The bonding occurs during the steps 210 through 212 when the polymer particles are expanding using steam to form an in-situ core with the plastic layer.

Figure 10:
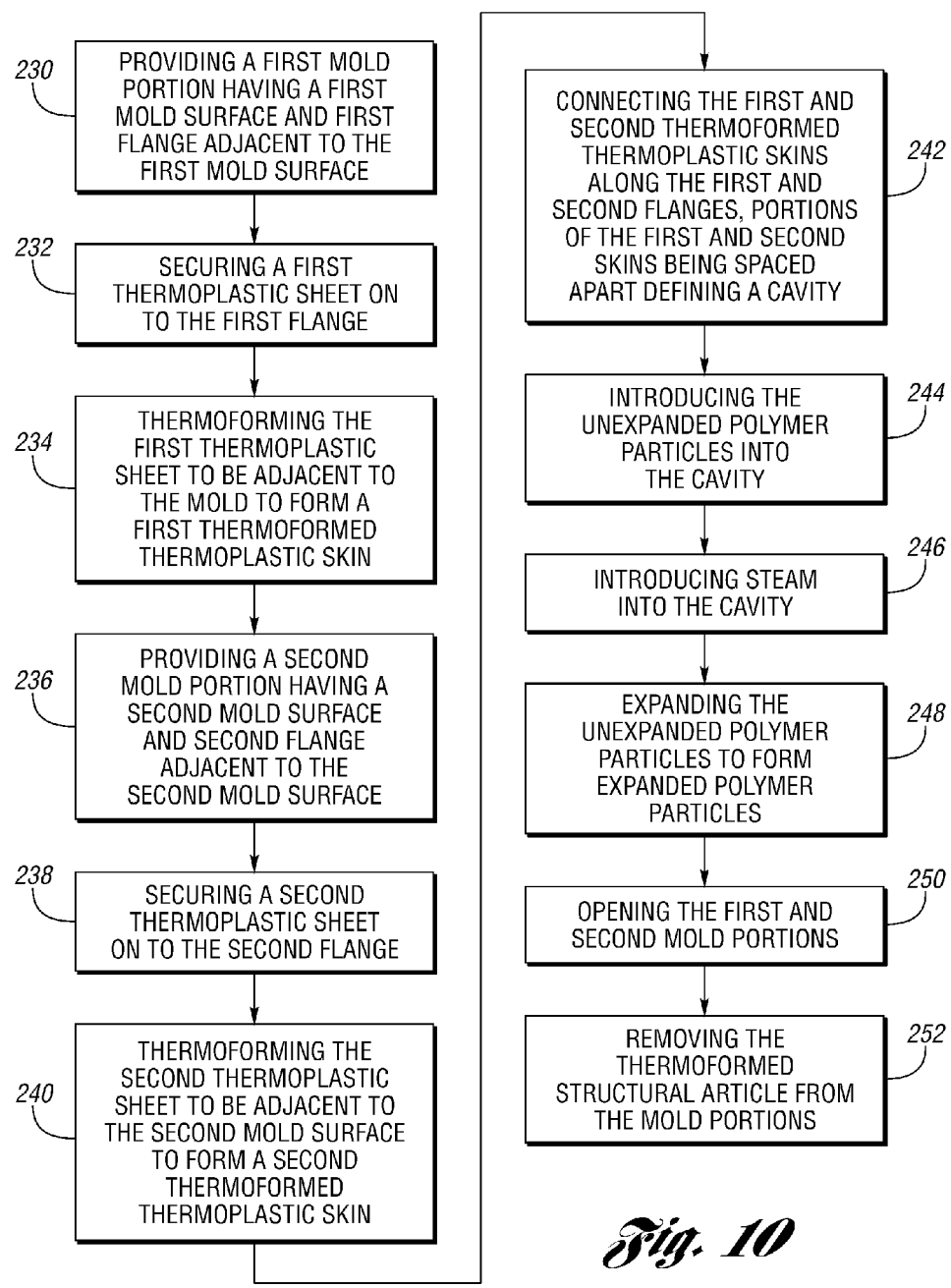
FIG. 10 recites a method of manufacture according to another embodiment.

Referring now to FIG. 10, a method is recited for forming an article using twin sheet thermoforming skins with the expanding foam core. In step 230 a first mold portion having a first mold surface and first flanges adjacent to first mold surface is provided. In step 232, a first thermoplastic sheet is secured to the first flange. In step 234, the first thermoplastic sheet is thermoformed adjacent to the mold to form the first thermoformed thermoplastic skin.

In step 236, a second mold portion having a second mold surface and second flange adjacent to the second mold surface is provided. In step 238, a second thermoplastic sheet is secured on to the second flange. In step 240, the second thermoplastic sheet is thermoformed to be adjacent to the second mold surface to form a second thermoformed thermoplastic skin.

The first and second thermoformed thermoplastic skins are connected along the first and second flange in step 242, closing the mold. Portions of the first and second skins are spaced apart defining a cavity. In step 244, unexpanded polymer particles are introduced into the cavity. In step 246, steam is introduced into the cavity. The unexpanded polymer particles expand to form expanded polymer particles in step 248. After the polymer particles cease substantially to expand, the first and second mold portions are opened. In step 252, the thermoformed structural plastic article is removed from the mold portions.

It is understood that unexpanded polymer particles may include partially expanded polymer particles. It is also understood that the polymer particles may cease substantially to expand when the pressure in the mold in certain embodiments is 0.5 lbf/in$^2$ or less. In other embodiments, the pressure in the mold when the polymer particles may cease to expand substantially may range from 0.1 lbf/in$^2$ to 1 lbf/in$^2$.

Figure 11:
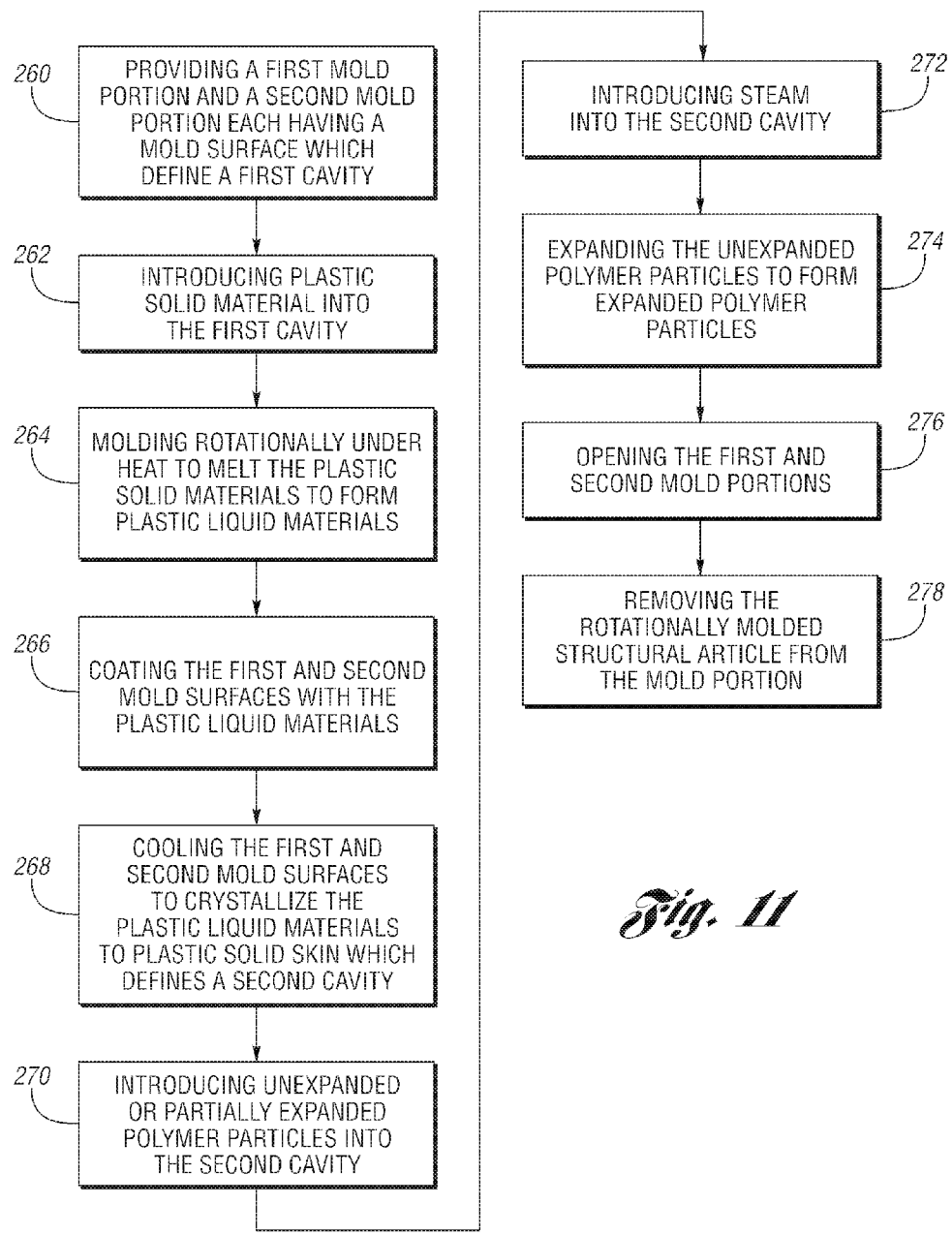
FIG. 11 recites a method of manufacture according to another embodiment.

In FIG. 11, another embodiment of a method of manufacture of the structural plastic articles is disclosed. In step 260, a first mold portion and a second mold portion each having a mold surface are provided. The two mold surfaces define a first cavity. In step 262, a plastic solid material is introduced into the first cavity. In step 264, the plastic solid material is molded rotationally under heat to melt the plastic solid to form plastic liquid materials. In step 266, the liquid plastic materials coat the first and second mold surfaces. In step 268, the first and second mold surfaces are cooled to crystallize the plastic liquid materials to plastic solid skin which defines a second cavity. In step 270, unexpanded or partially expanded polymer particles are introduced into the second cavity. In step 272, steam is introduced into the second cavity. In step 274, the unexpanded polymer particles are expanded by the steam to form expanded polymer particles. When the expansion of the polymer particles has substantially ceased, the first and second mold portions are opened in step 276. In step 278, the rotationally molded structural plastic article is removed from the mold portion. It should be understood, that curable plastic materials may be introduced in step 262 as a substitute for the plastic solid materials without exceeding the scope or spirit of the embodiment. It is also understood, that some liquid materials in certain embodiments, will require little or no heat beyond the ambient room temperature to begin curing the plastic liquid materials to crystallize or otherwise solidify the plastic liquid material in step 268. It is also understood that rotationally molding the structural plastic article may use processes such as rotational molding or rotocasting.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a plastic article, the steps comprising:
   providing a first heated plastic layer to a first mold section having a first molding surface to form a first molded skin;
   thermoforming the first heated plastic layer to first molding surface;
   providing a second heated plastic layer to a second mold section having a second molding surface to form a second molded skin;
   thermoforming the second heated plastic layer to the second molding surface;
   moving the first and second mold sections into cooperation with one another, connecting the first and second molded skins to form an internal cavity there between;
   substantially filling the internal cavity with pre-puff polymer foam beads;
   injecting a heated medium into the cavity for a limited period of time sufficient to cause the polymer foam beads to expand, melt together and bond to the first and second molded skins, while simultaneously venting cooled heating medium from the internal cavity, expanding the polymer foam beads to form an in-situ core of expanded polymer foam beads, the core being heat-bonded to the first and second molded skins forming the plastic article; and
   releasing the plastic article from the first and second mold section.

2. The method of claim 1, further comprising the step of: cooling the plastic article while still retained within the first and second mold sections, by injecting a cooling gas into the internal cavity while simultaneously venting warmed cooling medium from the internal cavity.

3. The method of claim 1, wherein the plastic article is a pallet component.

4. A method for forming a plastic article, the steps comprising:
   providing a first heated plastic layer to a first mold section having a first molding surface to form a first molded skin;
   thermoforming the first heated plastic layer to first molding surface;
   providing a second heated plastic layer to a second mold section having a second molding surface to form a second molded skin;
   thermoforming the second heated plastic layer to the second molding surface;
   connecting the first and second molded skins to form a gas-tight cavity;
   providing pre-puff polymer particles to the cavity;
   injecting a heated medium into the cavity for a limited period of time;
   expanding the pre-puff polymer particles to form an in-situ core of expanded polymer particles, the core being heat-bonded to the first and second molded skins forming the plastic article; and
   releasing the plastic article from the first and second mold section.
   wherein the core has a first density zone and a second density zone, the first density zone having a density greater than 1 lb/ft$^3$ greater than a density of the second density zone.

5. The method of claim 3, further comprising the step of connecting the pallet component to a pallet bottom deck.

6. The method of claim 3, wherein the pallet component includes a plurality of slots.

7. The method of claim 1, wherein the first plastic layer has a first thickness and the second plastic layer has a second thickness, the first thickness being less than the second thickness.

8. The method of claim 1, wherein the first heated plastic layer, the heated second plastic layer, and the in-situ core are compatible recyclable materials.

9. The method of claim 1, wherein the first heated plastic layer has a first composition, the second heated plastic layer has a second composition, the first composition differing from the second composition.

10. The method of claim 4, wherein the first plastic layer, the second plastic layer and the core have a compatible recyclable polyolefin composition.

* * * * *

UNITED STATES PATENT AND TRADEMARK OFFICE
CERTIFICATE OF CORRECTION

| | | |
|---|---|---|
| PATENT NO. | : 9,272,484 B2 | Page 1 of 1 |
| APPLICATION NO. | : 13/358181 | |
| DATED | : March 1, 2016 | |
| INVENTOR(S) | : Richard W. Roberts, Jr. | |

It is certified that error appears in the above-identified patent and that said Letters Patent is hereby corrected as shown below:

In the claims,

Column 11, Line 15, Claim 1:

After "the first heated plastic layer to"
Insert -- a --.

Signed and Sealed this
Twenty-fourth Day of May, 2016

Michelle K. Lee
*Director of the United States Patent and Trademark Office*